(12) United States Patent
Shimomura et al.

(10) Patent No.: US 7,349,850 B2
(45) Date of Patent: Mar. 25, 2008

(54) PROGRAM, SPEECH INTERACTION APPARATUS, AND METHOD

(75) Inventors: Hideki Shimomura, Kanagawa (JP); Masahiro Fujita, Saitama (JP); Ugo Di Profio, Tokyo (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 10/381,351

(22) PCT Filed: Jul. 26, 2002

(86) PCT No.: PCT/JP02/07612

§ 371 (c)(1),
(2), (4) Date: Mar. 26, 2003

(87) PCT Pub. No.: WO03/010756

PCT Pub. Date: Feb. 6, 2003

(65) Prior Publication Data

US 2004/0015344 A1    Jan. 22, 2004

(30) Foreign Application Priority Data

Jul. 27, 2001    (JP) .............................. 2001-227702

(51) Int. Cl.
*G10L 15/00* (2006.01)
(52) U.S. Cl. ...................... 704/270; 704/275
(58) Field of Classification Search ................. 704/270, 704/275
See application file for complete search history.

(56) References Cited

U.S. PATENT DOCUMENTS 5,577,165 A * 11/1996 Takebayashi et al. ........ 704/275

6,122,613 A * 9/2000 Baker .......................... 704/235

FOREIGN PATENT DOCUMENTS

| JP | 7-219961    | 8/1995  |
| JP | 2000-339314 | 12/2000 |

OTHER PUBLICATIONS

Kazunari Meyoshi, Mio Fujisawa, Toshikazu Takagi, Teruaki Aizawa, "Jiyu Tenkai Type no Taiwa no Tame no Taiwa Shori System ni Kansuru Kosatsu", The Institute of Electronics, Information and Communication Engineers Gijutsu Kenkyu Hokoku [Shiko to Gengo], Dec. 11, 1997, TL97-12, pp. 9 to 17.

* cited by examiner

*Primary Examiner*—Daniel Abebe
(74) *Attorney, Agent, or Firm*—Frommer Lawrence & Haug LLP; William S. Frommer; Thomas F. Presson

(57) ABSTRACT

The present invention relates to a program that allows a conversation to be performed with a user in a natural and human-like manner. Each of response candidate generating modules 54a through 54c generates response candidate data based on its own rule, in response to voice data input from the outside through an input module 51 and a response selecting module 52, and calculates a score of the response candidate data based on the response candidate data, the voice data and internal status data recorded in an internal status recording module 55, and then supplies the score to a response selecting module 52. In response to the supplied score, the response selecting module 52 selects, as response data responsive to the input voice data, one piece of response candidate data, and outputs the one piece of response candidate data through a response output module 53. The present invention is applicable to a voice interactive apparatus mounted on a robot, etc.

13 Claims, 7 Drawing Sheets

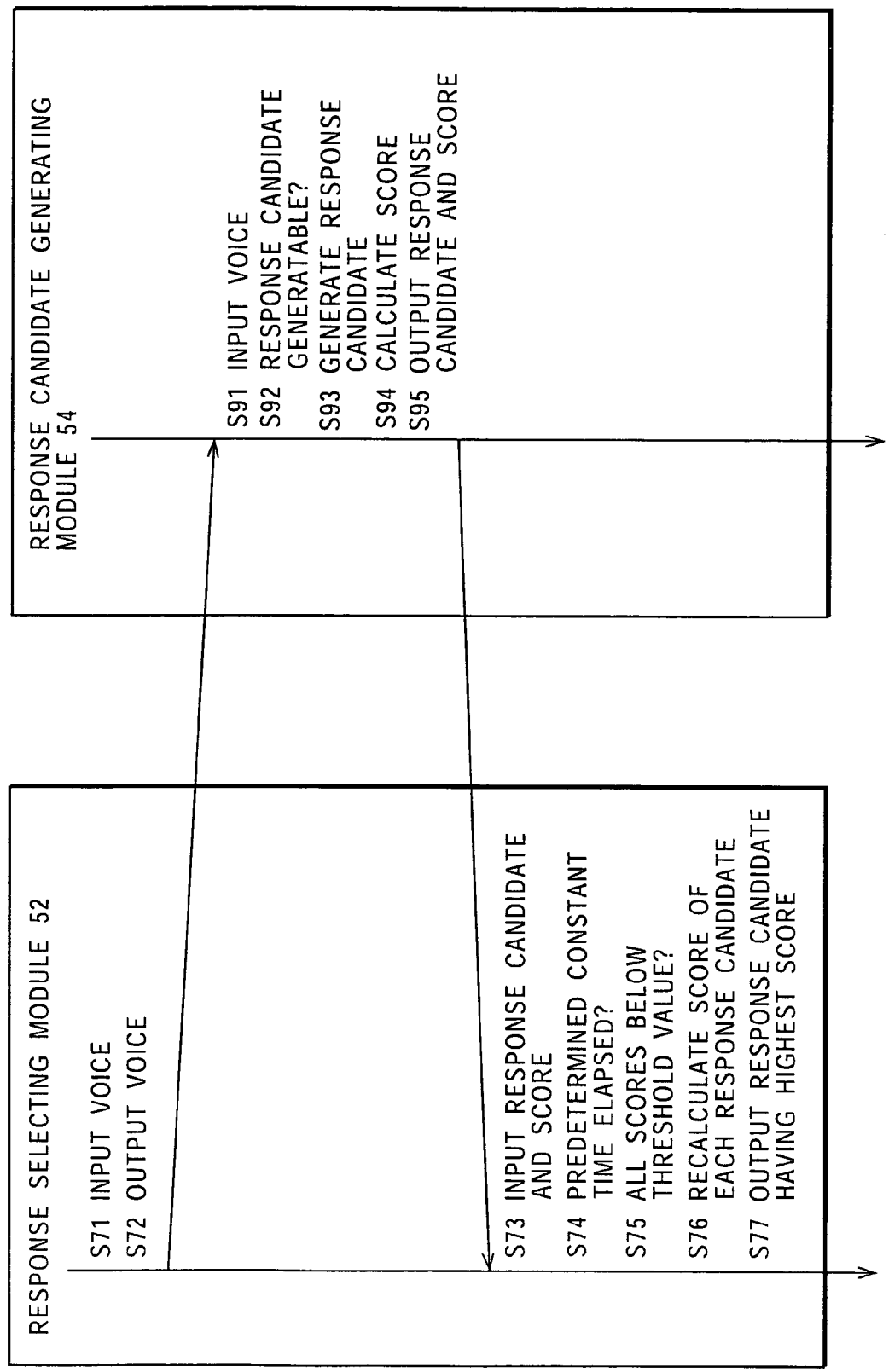

FIG. 6

| | 1 | 2 | | 3 | | 4 | |
|---|---|---|---|---|---|---|---|
| | INPUT (VOICE) | RESPONSE CANDIDATE GENERATING MODULE 54a (CHAT) | | RESPONSE CANDIDATE GENERATING MODULE 54b (COMMAND INTERPRETATION AND EXECUTION) | | RESPONSE CANDIDATE GENERATING MODULE 54c (JOKING) | |
| | | RESPONSE CANDIDATE | SCORE | RESPONSE CANDIDATE | SCORE | RESPONSE CANDIDATE | SCORE |
| 1 | I HAD A ROUGH DAY. | WHAT HAPPENED? | 70 | | 0 | | 0 |
| 2 | WINDY DAY, WASN'T IT? | YES, IT WAS. | 80 | | 0 | CALM STORM. | 50 |
| 3 | MY BLANKET BLEW AWAY! | DID YOUR BLANKET BLOW AWAY? | 70 | | 0 | I HOPE YOU HAVE BLANKET COVERAGE. | 90 |
| 4 | OH, THAT'S AWFUL. | SORRY. | 90 | | 0 | | 0 |

FIG. 7

| INPUT (VOICE) | RESPONSE CANDIDATE GENERATING MODULE 54a (CHAT) | | RESPONSE CANDIDATE GENERATING MODULE 54b (COMMAND INTERPRETATION AND EXECUTION) | | RESPONSE CANDIDATE GENERATING MODULE 54c (JOKING) | |
|---|---|---|---|---|---|---|
| | RESPONSE CANDIDATE | SCORE | RESPONSE CANDIDATE | SCORE | RESPONSE CANDIDATE | SCORE |
| 1  I WANT TO WATCH TV. | DO YOU? | 70 | | 0 | | 0 |
| 2  TURN ON THE TV. | I SEE. | 30 | (TV IS TURNED ON) OK, I TURNED ON THE TV. | 100 | | 0 |
| 3  WOW, THAT'S FUNNY. | YES, IT IS. | 70 | | 0 | WHITE HEADED DOG ALSO WHITE TAIL. | 50 |

PROGRAM, SPEECH INTERACTION APPARATUS, AND METHOD

TECHNICAL FIELD

The present invention relates to a program, voice interactive apparatus, and voice interactive method and, more particularly, to a program, voice interactive apparatus, and voice interactive method for allowing a conversation to be performed in a natural and human-like manner.

BACKGROUND ART

Conventional voice interactive apparatuses have a main objective of performing a single task, such as "booking passage by air by telephone".

The conventional voice interactive apparatus talks with a user following faithfully a single scenario to perform a task. If a voice not present in the scenario is input from the user, the conventional voice interactive apparatus outputs a response message such as "I don't understand it" or "Please reply in yes or no", and then waits on standby until a next voice is input.

When an object such as a robot or an image object (such as a character in a computer game) in a virtual world talks with a user, such an object needs to converse with the user in a natural and human-like manner, for example, by chatting with the user for no particular purposes, in addition to a conversation required for the above-mentioned simple task. The chat may include returning a reply containing a joke.

Even if the conventional voice interactive apparatus is mounted on the abject, the object is unable to converse with the user in a natural and human-like manner.

To cause the conventional voice interactive apparatus to perform a process to talk interactively in a natural and human-like manner is not an effective method because of the following three reasons.

As a first reason, "the conventional voice interactive apparatus is constructed of a single scenario described using a state transition model and it is difficult to equip the model with a process for a natural and human-like conversation".

The state transition model is a model equivalent to a so-called automaton which is expressed in a description such as a description "if B is input in a state A, C is output and the state A is shifted to a state D".

To allow the state transition model to perform a natural and human-like conversation such as a chat and joke in addition to a purpose-oriented conversation, a designer must predict all events that could occur in all states, and describe rules response to the events in the model. It is extremely difficult and practically impossible for the designer to complete these jobs.

As a second reason, "a plurality of types or a plurality of features of response sentences must be output to perform a natural and human-like conversation, there are a plurality of algorithms to generate these response sentences depending on the type and feature of the generated sentence, and it is difficult to organize these algorithms in a single scenario"

For example, a simple response sentence generating algorithm such as "Eliza" ("Language Engineering", pages 226-228, authored by Makoto NAGAO and published SHOKODO) is an algorithm in which a rule defining an output response sentence in response to an input character string is predetermined, and an output response sentence is generated through a matching process with an input sentence.

In joke sentence generating algorithms such as "B CLASS MACHINE" ("AERA" 2001.2.12 issue, page 80, published Asahi Shinbun Sha), or "BOKE" (article "BOKE: A Japanese punning riddle generator" authored by Kim Binstead and Osamu Takizawa), a predetermined character string processing algorithm is run based on a key word, and a joke is generated by modifying an input sentence.

It is difficult to organize completely different sentence generating algorithms in a single scenario.

As a third reason, "even if it is possible to implement a process for a natural and human-like conversation in a single scenario, the implementation method is not an efficient method from system flexibility if the implementation method is considered as a software development method".

DISCLOSURE OF THE INVENTION

Accordingly, it is an object of the present invention to manufacture efficiently and to provide a voice interactive apparatus which converses with the user in a natural and human-like manner.

A first computer program of the present invention includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison.

In accordance with the first program, the first and second response candidate generating steps may respectively include calculating the first and second response candidate data based on internal status data recorded beforehand, and calculating the first and second scores, and the response selecting step includes selecting the response data based on the internal status data.

In the response selecting step, one of the first and second scores may be recalculated based on the internal status data.

The first computer program may further include a recording step of recording, as the internal status data, the input voice data and the response data selected in the response selecting step.

The first computer program may further include an internal status data updating step of monitoring already stored internal status data, and of updating, with time, predetermined data of the already stored internal status data when one of the voice data and the response data is recorded as one piece of new internal status data in the recording step.

In the first computer program, the response selecting step may include selecting preset response data when each of the first and second scores is below a predetermined threshold value.

A first storage medium of the present invention stores a computer readable program, and the program includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison.

A first voice interactive apparatus of the present invention includes first response candidate generator means for generating first response candidate data responsive to input voice data in accordance with a first rule and for calculating a first score of the generated first response candidate data, second response candidate generator means for generating second response candidate data responsive to the input voice data in accordance with a second rule independent of the first rule, and for calculating a second score of the generated second response candidate data, and response selector means for comparing the first score calculated by the first response candidate generator means with the second score calculated by the second response candidate generator means and for selecting, as response data responsive to the input voice data, one of the first response candidate data generated by the first response candidate generator means and the second response candidate data generated by the second response candidate generator means, based on the result of the comparison.

A first voice interactive method of the present invention includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison.

In the first computer program, the first storage medium, the first voice interactive apparatus, and the first voice interactive method of the present invention, the first response candidate data and second response candidate data, responsive to the input voice data, are generated in accordance with mutually independent rules, and the scores of the first and second response candidate data are then calculated. The calculated scores are compared, and one of the first and second response candidate data is then selected as the response data responsive to the input voice data.

A second computer program of the present invention includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold.

A second storage medium of the present invention stores a computer readable program, and the program includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold.

A second voice interactive apparatus of the present invention includes first response candidate generator means for generating first response candidate data responsive to input voice data in accordance with a first rule and for calculating a first score of the generated first response candidate data, second response candidate generator means for generating second response candidate data responsive to the input voice data in accordance with a second rule independent of the first rule, and for calculating a second score of the generated second response candidate data, and response selector means for determining whether each of the first score calculated by the first response candidate generator means and the second score calculated by the second response candidate generator means is equal to or larger than a predetermined threshold value, in the order of from the first to second or from the second to first response candidate generator means whichever has priority, and for selecting, as response data responsive to the input voice data, one of the first response candidate data generated by the first response candidate generator means and the second response candidate data generated by the second response candidate generator means whichever has the score that is determined to be equal to or larger than the predetermined threshold.

A second voice interactive method of the present invention includes a first response candidate generating step of generating first response candidate data responsive to input voice data in accordance with a first rule and of calculating a first score of the generated first response candidate data, a second response candidate generating step of generating second response candidate data responsive to the input voice data in accordance with a second rule independent of the first rule, and of calculating a second score of the generated second response candidate data, and a response selecting step of determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold.

In the second computer program, the second storage medium, the second voice interactive apparatus, and the second voice interactive method of the present invention, the first response candidate data and second response candidate data, responsive to the input voice data, are generated in accordance with mutually independent rules, and the scores of the first and second response candidate data are then calculated. In the order of priority of the scores, a determination is made of whether each of the scores is equal to or larger than the predetermined threshold value. If it is determined that the score is equal to or larger than the predetermined threshold value, the first response candidate data or second response candidate data having that score is selected as the response data.

BRIEF DESCRIPTION OF THE DRAWINGS

FIG. 5 is a flow diagram illustrating the relationship between the process of the response selecting module of FIG. 2 and the process of the response candidate generating module of FIG. 2.

FIG. 6 lists an example of response candidate data the response candidate generating module of FIG. 2 generates in response to voice data input to the voice interactive apparatus illustrated in FIG. 1.

FIG. 7 lists another example of the response candidate data the response candidate generating module of FIG. 2 generates in response to the voice data input to the voice interactive apparatus illustrated in FIG. 1.

BEST MODE FOR CARRYING OUT THE INVENTION

Figure 1:
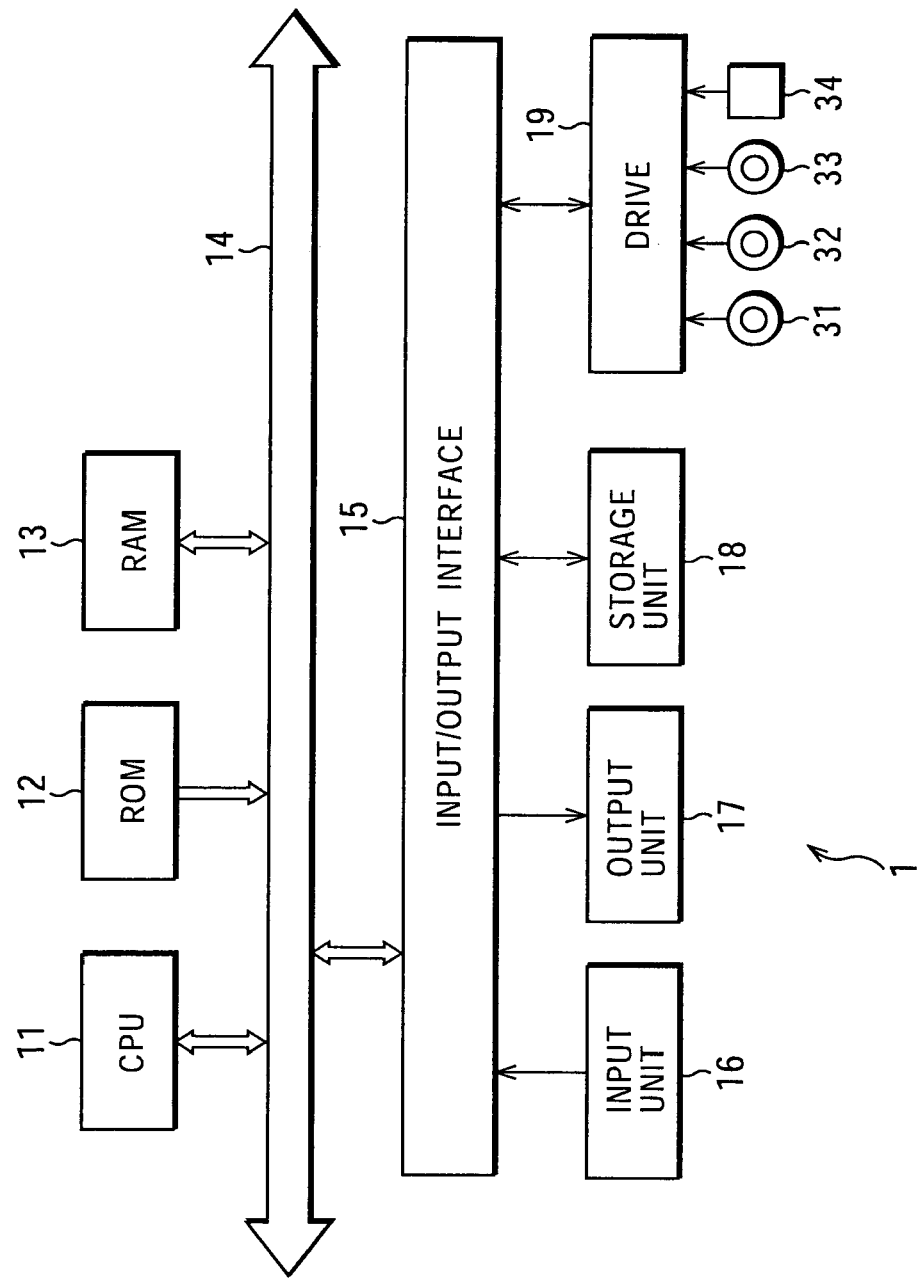
FIG. 1 is a block diagram illustrating the hardware construction of a voice interactive apparatus implementing the present invention.

FIG. 1 is a block diagram illustrating the hardware construction of a voice interactive apparatus implementing the present invention.

In the discussion that follows, it is assumed that a voice interactive apparatus 1 is mounted on a robot.

Referring to FIG. 1, a CPU (Central Processing Unit) 11 performs a variety of processes in accordance with a program stored in an ROM (Read-Only Memory) 12 and a program which is loaded into a RAM (Random-Access Memory) 13 from a storage unit 18. The RAM 13 stores, as necessary, data the CPU 11 requires to execute a variety of processes.

The CPU 11, ROM 12, and RAM 13 are mutually interconnected through a bus 14. An input/output interface 15 is connected to the bus 14.

Connected to the input/output interface 15 are an input unit 16 including various sensors mounted on a robot, and a microphone, an output unit 17 including a loudspeaker, and the storage unit 18 including a hard disk device.

A drive 19 is also connected to the input/output interface 15 as necessary. A magnetic disk 31, an optical disk 32, an electro-optical disk 33, or a semiconductor memory 34 is loaded onto the drive 19, as necessary. A computer program read from one of these is installed onto the storage unit 18, as necessary.

Figure 2:
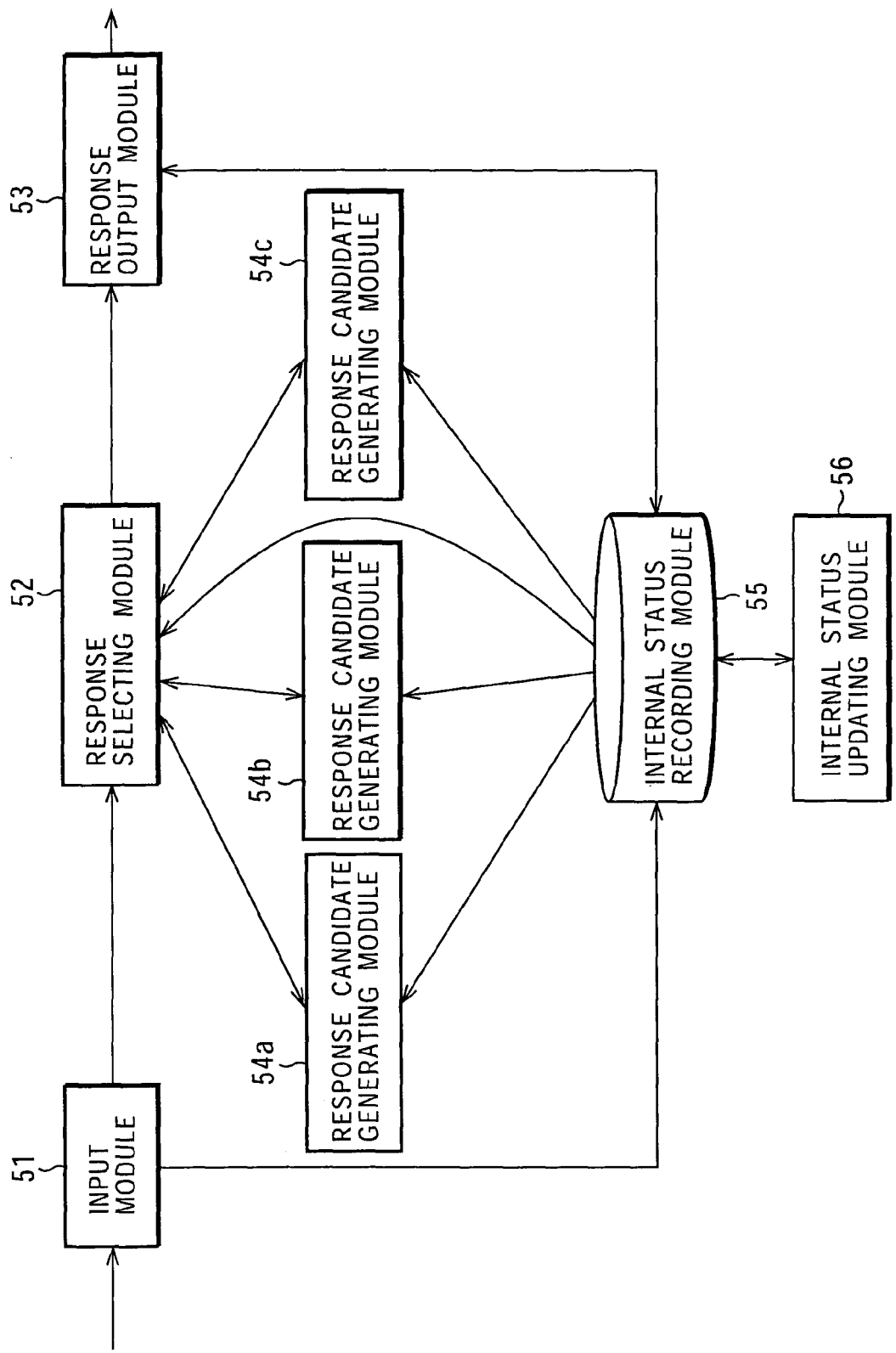
FIG. 2 is a block diagram illustrating the configuration of a software program of the voice interactive apparatus of FIG. 1.

FIG. 2 is a block diagram illustrating the configuration of a software program of the voice interactive apparatus of FIG. 1. The software program includes a plurality of modules. Each module has its own independent algorithm, and performs an operation unique thereto in accordance with the algorithm. Specifically, the CPU 11 (FIG. 1) reads and executes each module.

Referring to FIG. 2, an input module 51 is connected to a response output module 53 through a response selecting module 52. The response selecting module 52 is connected to any number of modules including response candidate generating modules 54a through 54c (three modules in this example), and an internal status recording module 55. The internal status recording module 55 is connected to the input module 51, response output module 53, response candidate generating modules 54a through 54c, and internal status updating module 56.

The function of each of the input module 51 through the internal status updating module 56 is individually discussed below.

The input module 51 converts an input signal received by the input unit 16 (FIG. 1) into data. When a voice signal is input through a microphone, the input module 51 converts the voice signal into voice data. When an image signal is input through an image sensor, the input module 51 converts the image signal into image data. When an sensor signal is input through a sensor, the input module 51 converts the sensor signal into data having a meaning which is directly estimated from the sensor signal (such as the name and position of a person, or information that the robot is being beaten).

The input module 51 manages the chronological order of input signals. For example, if the voice signal and the sensor signal are almost concurrently input, the input module 51 generates data that represents that both signals are generated at the same action.

The input module 51 then outputs the converted data and generated data to the response selecting module 52 and internal status recording module 55, respectively.

Not only the voice data converted from the above-described voice signal but also the data output from the input module 51 is hereinafter collectively referred to as voice data.

The response selecting module 52 selects, as response data responsive to the voice data input from the input module 51, one of the response candidate data generated by the response candidate generating modules 54a through 54c to be discussed later, and outputs the response data to the response output module 53.

The response output module 53 converts the response data supplied from the response selecting module 52 into a response signal, and outputs the response signal to the outside through the output unit 17 (FIG. 1). If the output unit 17 is a loudspeaker, the loudspeaker converts the input response signal into a voice, thereby outputting the voice in response.

The response output module 53 outputs the input response data to the internal status recording module 55 to record history of the response data.

The response candidate generating module 54 (the response candidate generating modules 54a through 54c are collectively referred to as the response candidate generating module 54 if there is no need to discriminate between the response candidate generating modules 54a through 54c) generates response candidate in response to the voice data supplied from the response selecting module 52, independent of the other response candidate modules, calculates a score of the response candidate data, and outputs the generated response candidate data and the calculated score to the response selecting module 52.

The operation of the response selecting module 52 and the response candidate generating module 54 will be discussed in detail referring to flow diagrams illustrated in FIG. 3 and FIG. 4.

FIG. 5 is a flow diagram illustrating the relationship between the process of the response selecting module 52 and the process of the response candidate generating module 54. Referring to FIG. 3 and FIG. 5, the process of the response selecting module 52 will be discussed, and referring to FIG. 4 and FIG. 5, the process of the response candidate generating module 54 will be discussed. The relationship between the modules will be easily understood referring to corresponding steps illustrated in FIG. 5.

When the user speaks voice sounds, the input module 51 receives the voice as a signal through a microphone (the input unit 16 (FIG. 1)), and converts the voice into voice data. Furthermore, the input module 51 outputs the converted voice data to the response selecting module 52.

Figure 3:
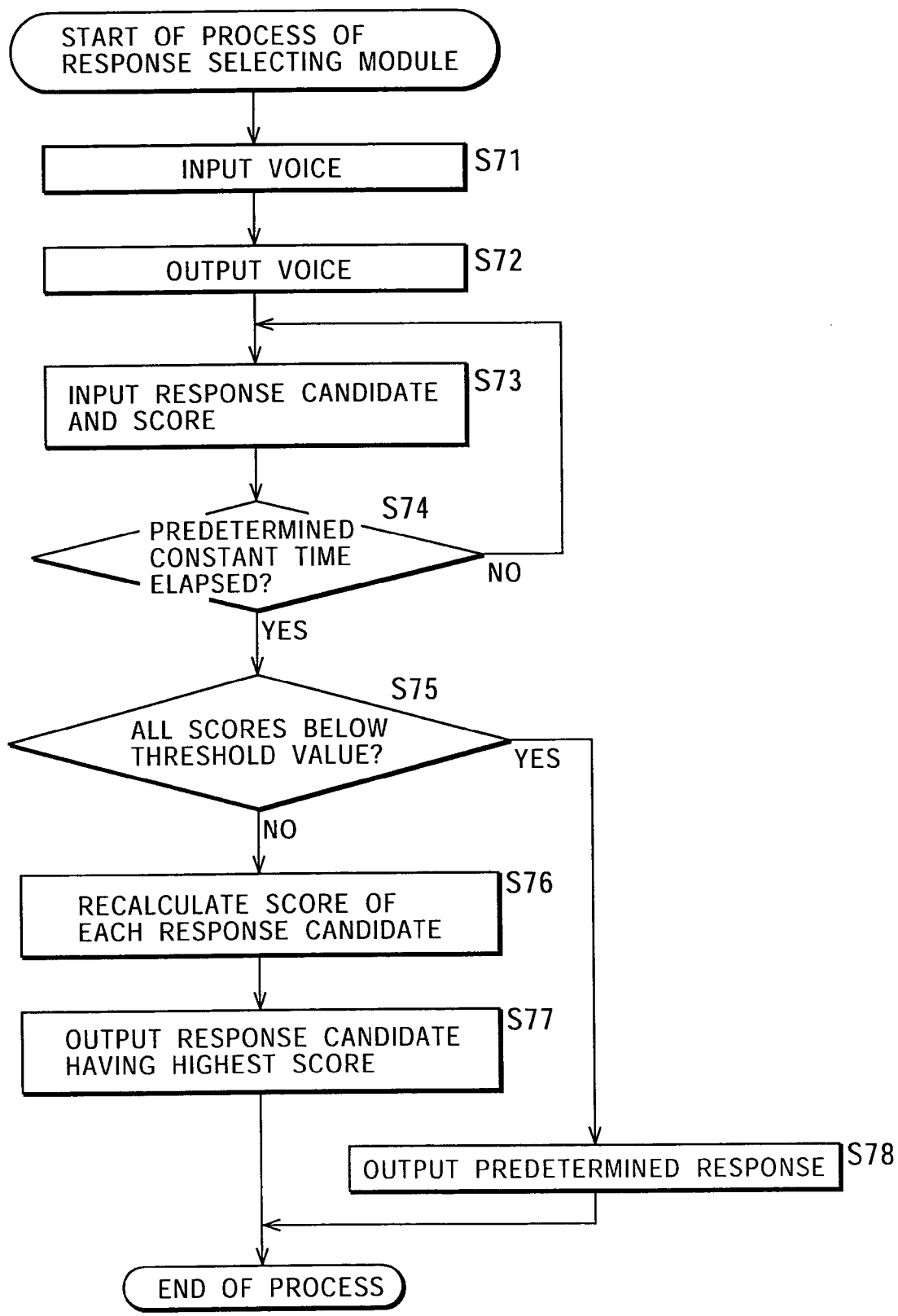
FIG. 3 is a flow diagram illustrating the process of a response selecting module of FIG. 2.

In step S71 in FIG. 3, the response selecting module 52 receives the voice data supplied from the input module 51.

In step S72, the response selecting module 52 outputs the voice data input in step S71 to each of the response candidate generating modules 54a through 54c.

The output voice data is input to each of the response candidate generating modules 54a through 54c in step S91.

Figure 4:
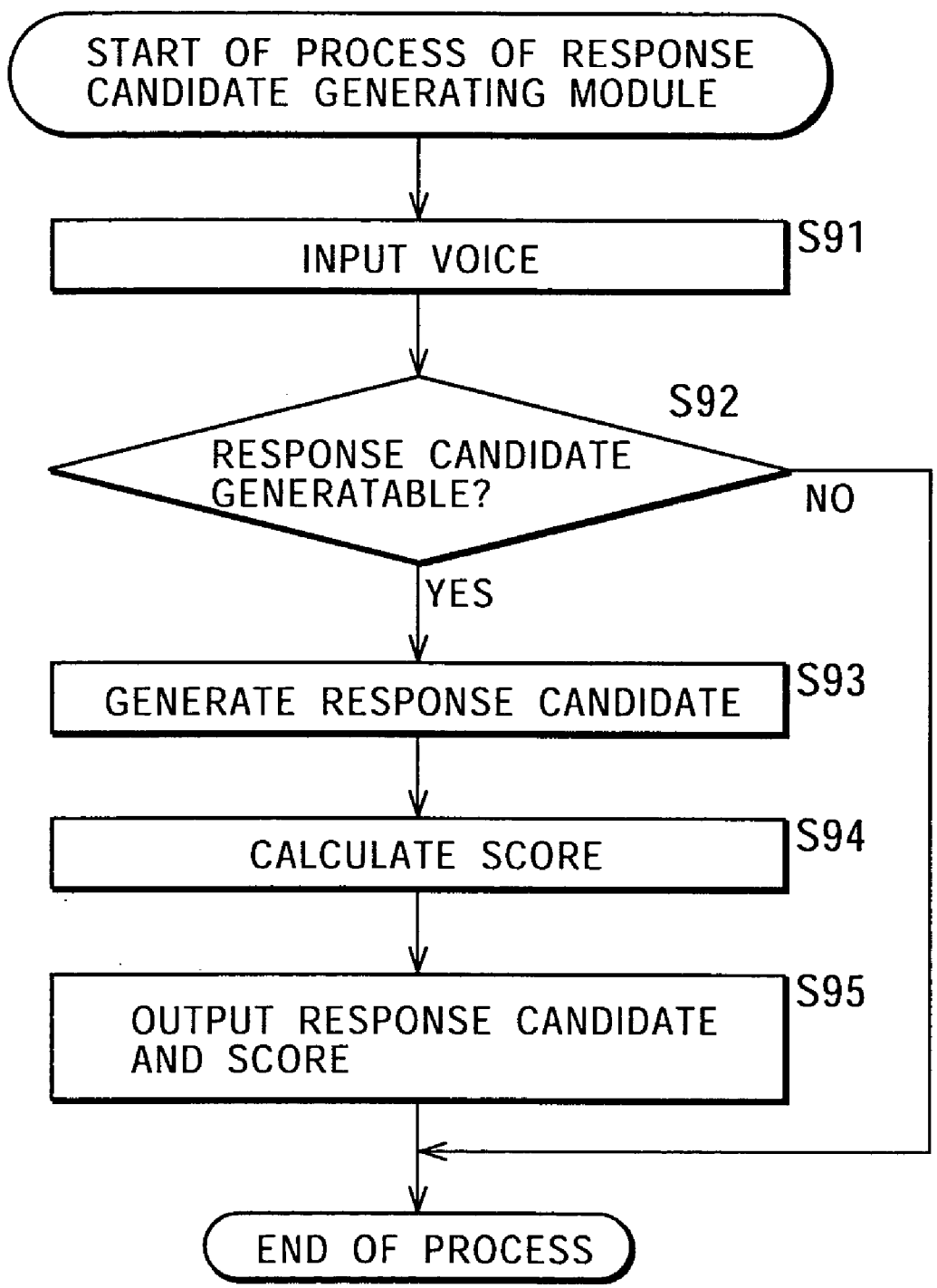
FIG. 4 is a flow diagram illustrating the process of a response candidate generating module of FIG. 2.

Each of the response candidate generating modules 54a through 54c generates response candidate data responsive to the voice data input from the response selecting module 52 independent of the other response candidate generating modules (step S93 in FIG. 4 and FIG. 5). Each of the response candidate generating modules 54a through 54c calculates a score of the generated response candidate data on its own judgement (step S94 in FIG. 4 and FIG. 5). Here, the score refers to a numerical expression of the degree of appropriateness of the generated response candidate data with respect to the input voice data and the internal status data recorded in the internal status recording module 55 to be discussed later. Each of the response candidate generating modules 54a through 54c outputs the response candidate data responsive to the input voice data and the score of the response candidate data to the response selecting module 52 (step S95 in FIG. 4 and FIG. 5).

In step S73, the response selecting module 52 receives the response candidate data and the score thereof when supplied from one of the response candidate generating modules 54a through 54c.

In step S74, the response selecting module 52 performs a time measurement function, thereby determining whether a predetermined constant time has elapsed.

If it is determined in step S74 that the predetermined constant time has not yet elapsed, the response selecting module 52 loops to step S73. When response candidate data and its score are supplied from another response candidate generating module 54, the response selecting module 52 receives them.

If the predetermined constant time has elapsed (if it is determined in step S74 that the predetermined constant time has elapsed), the response selecting module 52 determines in step S75 whether all scores received in step S73 are below a predetermined threshold.

If it is determined in step S75 that all scores are below the predetermined threshold, the response selecting module 52 outputs predetermined response data recorded beforehand in the storage unit 18 (FIG. 1), for example, message data saying "Do you?", to the response output module 53 in step S78.

As already discussed, the response selecting module 52 outputs the predetermined response in step S78. Step S78 may be omitted. Specifically, if it is determined in step S75 that all scores are below the predetermined threshold, the response selecting module 52 may perform a process that provides no output at all.

If it is determined in step S75 that at least one score is above the predetermined threshold (if it is determined in step S75 that not all scores are below the predetermined threshold), the response selecting module 52 recalculates, in step S76, the score which is determined to be above the predetermined threshold in step S75, out of the scores of the response candidate data input in step S73 (alternatively, all scores may be recalculated).

In step S77, the response selecting module 52 selects, as response data responsive to the voice data input in step S71, the response candidate data having the highest score among the recalculated scores, out of the response candidate data input in step S73, and outputs the selected response data to the response output module 53.

The response data is a combination of data of language (such as "What happened?", "Yes, it was" "Calm storm", etc. shown in FIG. 6 to be discussed later), data of action (such as "TV is turned on", etc. shown in FIG. 7 to be discussed later), data of combination of language and operation (for example, a combination of ("TV is turned on") and "OK, I turned on the TV" in FIG. 7 to be discussed later.

Step S76 may be omitted. Specifically, the response selecting module 52 selects the response data using the scores output from the response candidate generating modules 54a through 54c (the scores output in step S95 to be discussed later).

If the order of priority is preset to each of the response candidate generating modules 54a through 54c in accordance with the characteristics of an apparatus incorporating the voice interactive apparatus 1 (for example, a robot), the response selecting module 52 may select the response data in the following way.

If it is determined in step S74 that the predetermined constant time has elapsed, the response selecting module 52 does not perform steps S75 through S78. The response selecting module 52 regards, as a score of interest, the score output from the response candidate generating module 54 having the highest priority, and determines whether the score of interest is equal to or larger than a predetermined threshold (different from the predetermined threshold used in step S75). If it is determined that the score of interest is equal to or larger than the predetermined threshold, the response selecting module 52 selects, as the response data, the response candidate data having the score of interest (in this case, the response candidate data generated by the response candidate generating module 54 having the highest priority). If it is determined that the score of interest is less than the predetermined threshold, the response selecting module 52 regards, as a score of interest, the score output from the response candidate generating module 54 having the second priority, and determines whether the score of interest is equal to or larger than the predetermined threshold value. A similar calculation is thus repeated to select response data.

The operation of the response candidate generating modules 54*a* through 54*c* carried out in conjunction with the process of the response selecting module 52 shown in FIG. 3 will be discussed in detail with reference to flow diagrams illustrated in FIGS. 4 and 5. Since the operations of the response candidate generating modules 54*a* through 54*c* are substantially identical to each other, the operation of the response candidate generating module 54*c* is representatively discussed below.

As already discussed, the response selecting module 52 outputs the input voice data to the response candidate generating module 54*c* in step S72 illustrated in FIGS. 3 and 5.

In step S91, the response candidate generating module 54*c* receives the voice data supplied from the response selecting module 52.

In step S92, the response candidate generating module 54*c* determines whether the response candidate generating module 54*c* is able to generate response candidate data responsive to the voice data input in step S91 based on the internal status data recorded in the internal status recording module 55 to be discussed later.

If it is determined in step S92 that the generation of the response candidate data is impossible, the response candidate generating module 54*c* ends the process. Specifically, the response candidate generating module 54*c* gives no output to the response selecting module 52.

If it is determined in step S92 that the generation of the response candidate data is possible, the response candidate generating module 54*c* generates in step S93 the response candidate data responsive to the voice data input in step S91 based on the internal data (to be discussed in detail later) recorded in the internal status recording module 55.

It is assumed in step S91 that the voice data saying "I had a rough day" or "Oh, that's awful" shown in FIG. 6 is input to the response candidate generating module 54*c*. The response candidate generating module 54*c* determines in step S92 that the generation of joking sentence (response candidate data) is impossible, and gives no output.

If it is assumed in step S91 that the voice data "Windy day, wasn't it" shown in FIG. 6 is input to the response candidate generating module 54*c*. The response candidate generating module 54*c* determines in step S92 that the generation of a joking sentence (response candidate data) is possible. In step S93, the response candidate generating module 54*c* generates joking sentence data (response candidate data) saying "calm storm".

If voice data saying "My blanket blew away" shown in FIG. 6 is input in step S91, the response candidate generating module 54*c* determines in step S92 that the generation of joking sentence data (response candidate data) is possible, and then generates joking sentence data (response candidate data) saying "I hope you have blanket coverage" in step S93.

In step S94, the response candidate generating module 54*c* calculates a score of the response candidate data generated in step S93, based on the internal status data recorded in the internal status recording module 55 to be discussed later.

For example, the response candidate generating module 54*c* calculates the score based on the data of response history of jokes recorded in the internal status recording module 55, and a determination criterion held in the response candidate generating module 54*c* according to which the degree of humor of a joke is determined.

For example, the score of a joke saying "calm storm" responsive to an input voice saying "Windy day, wasn't it?" and the score of a joke saying "I hope you have blanket coverage" responsive to an input voice saying "My blanket blew away" are calculated according to the degree of humor, and both jokes are calculated to have "50" points. The points of each joke are set to be basic points of the score. If no joking response is output before a second conversation, additional "40" points are added to the points of the joke, namely, the basic points of the score.

In this example, when the additional "40" points are not added, the points of the joke becomes the score thereof. When the additional "40" points are added, the points of the joke with "40" points added becomes the score of the joke.

In the example illustrate in FIG. 6, the response saying "Calm storm" is the response candidate data for a second conversation, no additional "40" points are added, and the score remains unchanged from the basic points "50".

No joking response is output although the response "I hope you have blanket coverage?" is in a third conversation. The response saying "I hope you have blanket coverage" has "90" points because "40" points are added.

Returning to FIG. 4, in step S95, the response candidate generating module 54*c* outputs, to the response selecting module 52, the response candidate data generated in step S93 and the score calculated in step S94.

The response candidate generating module 54*c* generates the response candidate data based on a rule unique to itself that "a joking sentence is generated", without paying attention to the relationship with the other response candidate generating modules 54*a* and 54*b*.

The same is true of the response candidate generating modules 54*a* and 54*b*. In this example, the response candidate data is generated based on their own rules such as "chat" and "command interpretation and execution".

Each of the response candidate generating modules 54*a* through 54*c* simply considers a single state rather than all states that could happen.

As described above, the response selecting module 52 selects, as the response data a robot outputs in response, response candidate data appropriate for the state of conversation, from among a plurality of pieces of response candidate data respectively generated from the response candidate generating modules 54*a* through 54*c*.

To cause the robot (the voice interactive apparatus 1) to perform a high-level conversation (a more natural and human-like conversation), a response candidate generating module having a rule different from those of the response candidate generating modules 54a through 54c may be added to the voice interactive apparatus 1.

FIGS. 6 and 7 illustrate examples of the response candidate data which is generated by the response candidate generating modules 54a through 54c when the voice data is fed to each of the response candidate generating modules 54a through 54c.

Referring to FIGS. 6 and 7, examples of the voice input from the user are listed in first columns. Second columns shown in FIGS. 6 and 7 list output examples from the response candidate generating module 54a, namely, the response candidate data output in response to the voice input and the score of the response candidate data. Similarly, third columns shown in FIGS. 6 and 7 list output examples from the response candidate generating module 54b, and fourth columns in FIGS. 6 and 7 list output examples from the response candidate generating module 54c.

In these examples, the process in step S76 illustrated in FIGS. 3 and 5, i.e., the recalculation of the scores, is omitted.

As described above, each of the response candidate generating modules 54a through 54c generates response phrases in accordance with the rule of its own, and outputs the response phrases as the response candidate data. In these examples, the response candidate generating module 54a outputs a phrase of chatting as the response candidate data, the response candidate generating module 54b outputs a command interpretation and execution phrase for interpreting and executing a command as the response candidate data, and the response candidate generating module 54c outputs a joking phrase as the response candidate data.

The user now says "I had a rough day" to the voice interactive apparatus 1 (FIG. 1) as shown in FIG. 6.

The voice interactive apparatus 1 receives the voice saying "I had a rough day" through the microphone (the input unit 16 (FIG. 1)), and inputs the voice to the response selecting module 52 through the input module 51 as previously described (referring to FIG. 2). The response selecting module 52 outputs the received voice data to each of the response candidate generating modules 54a through 54c.

Each of the response candidate generating modules 54a through 54c generates the response candidate data responsive to the voice data corresponding to the input voice saying "I had a rough day".

As shown in FIG. 6, the response candidate generating module 54a generates the response candidate data saying "What happened?", calculates the score of the response candidate data as "70" points, and outputs then the score to the response selecting module 52. The other response candidate generating modules 54b and 54c generates no response candidate data responsive to "I had a rough day".

The response candidate data input to the response selecting module 52 is only "What happened?". The response saying "What happened?" is selected as the response data responsive to the voice of the user.

The response data is output from the response selecting module 52, and is then output to the outside of the voice interactive apparatus 1 through the response output module 53. Specifically, the voice interactive apparatus 1 outputs the voice saying "What happened?" through the loudspeaker (the output unit 17 (FIG. 1)) in response to the user voice saying "I had a rough day".

The user says "Windy day, wasn't it" in response to the response "What happened?" said by the voice interactive apparatus as shown in FIG. 6.

Similarly, each of the response candidate generating modules 54a and 54c feeds the response candidate data responsive to the voice data saying "Windy day, wasn't it" and the score of the response candidate data to the response selecting module 52. In the example shown in FIG. 6, the response candidate generating module 54a inputs, to the response selecting module 52, response candidate data "Yes, it was" and a score of "80". The response candidate generating module 54c inputs, to the response selecting module 52, response candidate data "Calm storm" together with a score of "50". The response candidate generating module 54b inputs nothing to the response selecting module 52.

Upon receiving two pieces of response candidate data, the response selecting module 52 selects one piece of response candidate data as the response data responsive to the user voice saying "Windy day, wasn't it" in accordance with the two input scores.

The score of the response saying "Yes, it was" is "80" points, and the score of the response "Calm storm" is "50" points. The response saying "Yes, it was" having a higher score is selected and output as the response data.

Similarly, the response candidate generating module 54c generates the response candidate data saying "I hope you have blanket coverage" in response to the voice saying "My blanket blew away" said by the user. The response candidate generating module 54a generates the response candidate data "Did your blanket blow away?" in response to the voice "My blanket blew away" said by the user. The response candidate data saying "I hope you have blanket coverage", having a score of "90" points higher than a score of "70" points of the response candidate data "Did your blanket blow away?", is selected and output as the response data.

Since only the response candidate data saying "Sorry" generated by the response candidate generating module 54a in response to the user voice saying "Oh, that's awful" is input to the response selecting module 52, the response "Sorry" is selected and output as the response data.

The user now says to the robot "I want to watch TV" as shown in FIG. 7.

As shown, only the response candidate data saying "Do you?" generated by the response candidate generating module 54a is input to the response selecting module 52. The response saying "Do you?" is selected and output in response to the voice of the user saying "I want to watch TV".

The user may say "Turn on the TV".

The response candidate data saying "(TV is turned on) OK, I turned on the TV" generated by the response candidate generating module 54b and having the highest score of "100" points is selected and output as response data responsive to the voice of the user saying "Turn on the TV". Here, (TV is turned on) is data representing an action execution command to "cause the robot to press the power switch on the TV". The robot responds by saying "OK, I turned on the TV" after pressing the power switch of the TV in response to the voice of the user saying "Turn on the TV".

The response candidate generating module 54a generates the response candidate data saying "Yes, it is" in response to the voice of the user saying "Wow, that's funny". The response candidate generating module 54c generates the response candidate data saying "White headed dog also has white tail" in response to the voice of the user saying "Wow, that's funny". The response candidate data saying "Yes, it is", having a score of "70" points higher than a score of "50" points of the response candidate data saying "White headed dog also has white tail", is selected and output as the response data.

The voice of the user and the responses of the robot are sequentially listed as follows:

Example listed in FIG. 6
User: "I had a rough day."
Robot: "What happened?"
User: "Windy day, wasn't it?"
Robot: "Yes, it was."
User: "My blanket blew away!"
Robot: "I hope you have blanket coverage."
User: "Oh, that's awful."
Robot: "Sorry!"

Example listed in FIG. 7
User: "I want to watch TV."
Robot: "Do you?"
User: "Turn on the TV."
Robot: "(TV is turned on) OK, I turned on the TV."
User: "Wow, that's funny."
Robot: "Yes, it is."

The response selecting module 52 selects and outputs the appropriate response data in response to the voice of the user in this way as a response from the robot incorporating the voice interactive apparatus 1. The robot thus converses with the user in a natural and human-like manner.

In the examples listed in FIGS. 6 and 7, the process in step S76, i.e., the recalculation of the scores is omitted. Alternatively, without omitting step S76, the scores of the response candidate data may be recalculated referring to the internal status data recorded in the internal status recording module 55 to be discussed later. The response selecting module 52 selects response data appropriate for the conversation and the internal status of the robot.

For example, the response selecting module 52 determines that joking is more appropriate than a chat as a response by referring to the internal status data in the course of selecting the response data responsive to the input voice of the user saying "Wow, that's funny" listed at a fourth row listed in FIG. 7.

The response selecting module 52 recalculates the scores so that a joke as the response candidate data has a higher score. It is now assumed that the recalculation is performed by adding a score of "25" points to the joke as the response candidate data.

Subsequent to the recalculation, the joking response data of the response candidate generating module 54c, namely, "White headed dog also has white tail" has a score of "75" points. The response saying "White headed dog also has white tail" having the highest score of "75" points is selected as the response data responsive to the voice of the user saying "Wow, that's funny".

It is now assumed that a serious talk is going on to inform the robot that the robot is in danger, although no flow diagram for that is provided. The response candidate generating module 54c generates a joking sentence as response candidate data. A score of that joking sentence becomes high. The joking sentence and the score thereof are input to the response selecting module 52. By referring to the internal status data, the response selecting module 52 determines that the serious talk is going on, and recalculates the scores so that the score of the joking sentence is reduced. In this way, an inappropriate situation that the robot responds with a joking sentence during the serious talk is thus restricted.

When the robot is in a bad mood, the robot may respond by denying or ignoring the command to "turn on TV". The response selecting module 52 thus easily recalculates the scores by referring to the internal status data of "sentiment" to be discussed later.

In the above example, the points of the scores are simply compared with each other to select the response data. The selection based on the score is not limited to any particular one.

Returning to FIG. 2, the internal status recording module 55 constructs a database in which a plurality of pieces of internal status data are stored.

The internal status data recorded in the internal status recording module 55 is referenced when the response selecting module 52 recalculates the scores (step S76 in FIGS. 3 and 5).

As already described, the internal status data recorded in the internal status recording module 55 is referenced when each of the response candidate generating modules 54a through 54c determines whether each of the response candidate generating modules 54a through 54c is able to generate the response candidate data, when each of the response candidate generating modules 54a through 54c generates the response candidate data, and when each of the response candidate generating modules 54a through 54c calculates the score (steps S93 through S95 in FIGS. 4 and 5).

The internal status data is thus formed of data of information listed below.

(1) Information Relating to the Instinct of the Robot
The degree of "appetite", "sleepiness" or "desire to touch someone else"

(2) Information Relating to the Sentiment of the Robot
The degree of "anger", "sadness", or "happiness"

(3) Information Relating to the Characteristic of the Robot
The degree of "hot temper" or "softness"

(4) Information Relating to the History of Conversations Up Until Now
For example, "the history of the voice data input to the input module 51", "the history of the response data output from the response output module 53", or "the history of the response data indicating which response candidate generating module 54 the response candidate data is selected and output from as the response data"

The internal status updating module 56 continuously monitors the internal status data recorded in the internal status recording module 55. When any internal status data is updated, or with elapse of time, the internal status recording module 55 updates predetermined internal status data.

The internal status updating module 56 results in a change, for example, "strengthens the degree of "anger" if the input voice data contains a disrespect", or "increases the "degree of sleepiness" with time".

To cause each module to perform a predetermined function, the program constituting each software for the function may be installed through a network or from a storage medium.

The storage medium may be a package medium which may be distributed separately from the apparatus to supply the user with the software programs as shown in FIG. 1. The package medium may be a magnetic disk 31 (such as a floppy disk), a optical disk 32 (such as a CD-ROM (Compact Disk-Read Only Memory) and a DVD (Digital Versatile Disk)), a magneto-optical disk 33 (such as an MD (Mini Disk)) or a semiconductor memory 34. The storage medium also may be an ROM 12 or a hard disk contained in the storage unit 18, each of which is supplied in the mounted state thereof in the apparatus and has a computer program stored therewithin.

It is not necessary that the process steps describing the software program to perform a diversity of processes be chronologically performed in the order stated in each flow diagram. Several process steps may be performed in parallel or separately.

Each module is not limited to any particular embodiment. For example, each module may be formed of hardware.

INDUSTRIAL APPLICABILITY

In the first computer program, the first voice interactive apparatus, and the first voice interactive method of the present invention, the first response candidate data and second response candidate data, responsive to the input voice data, are generated in accordance with mutually independent rules, and the response data is selected based on the scores of the first and second response candidate data. The apparatus thus converses with the user in a natural and human-like manner.

In the second computer program, the second voice interactive apparatus, and the second voice interactive method of the present invention, the first response candidate data and second response candidate data, responsive to the input voice data, are generated in accordance with mutually independent rules, and the response data is selected based on the priority and the scores of the first and second response candidate data. The apparatus thus converses with the user in a natural and human-like manner.

The invention claimed is:

1. A computer program comprising:
   a first response candidate generating step of generating first response candidate data responsive to input voice data in accordance with a first rule and of calculating a first score of the generated first response candidate data,
   a second response candidate generating step of generating second response candidate data responsive to the input voice data in accordance with a second rule independent of the first rule, and of calculating a second score of the generated second response candidate data,
   a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison,
   a determining step of determining whether said first score and said second score are above a predetermined threshold value, and
   a recalculating step of recalculating the score or scores determined by the determining step to be above the predetermined threshold value.

2. A computer program according to claim 1, wherein the first and second response candidate generating steps respectively comprise calculating the first and second response candidate data based on internal status data recorded beforehand, and calculating the first and second scores, and wherein the response selecting step comprises selecting the response data based on the internal status data.

3. A computer program according to claim 2, wherein the response selecting step further comprises recalculating one of the first and second scores based on the internal status data.

4. A computer program according to claim 2, further comprising a recording step of recording, as the internal status data, the input voice data and the response data selected in the response selecting step.

5. A computer program according to claim 4, further comprising an internal status data updating step of monitoring already stored internal status data, and of updating, with time, predetermined data of the already stored internal status data when one of the voice data and the response data is recorded as one piece of new internal status data in the recording step.

6. A computer program according to claim 1, wherein the response selecting step comprises selecting preset response data when each of the first and second scores is below said predetermined threshold value.

7. A storage medium storing a computer readable program, the program comprising:
   a first response candidate generating step of generating first response candidate data responsive to input voice data in accordance with a first rule and of calculating a first score of the generated first response candidate data,
   a second response candidate generating step of generating second response candidate data responsive to the input voice data in accordance with a second rule independent of the first rule, and of calculating a second score of the generated second response candidate data,
   a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison,
   a determining step of determining whether said first score and said second score are above a predetermined threshold value, and
   a recalculating step of recalculating the score or scores determined by the determining step to be above the predetermined threshold value.

8. A voice interactive apparatus comprising:
   first response candidate generator means for generating first response candidate data responsive to input voice data in accordance with a first rule and for calculating a first score of the generated first response candidate data,
   second response candidate generator means for generating second response candidate data responsive to the input voice data in accordance with a second rule independent of the first rule, and for calculating a second score of the generated second response candidate data,
   response selector means for comparing the first score calculated by the first response candidate generator means with the second score calculated by the second response candidate generator means and for selecting, as response data responsive to the input voice data, one of the first response candidate data generated by the first response candidate generator means and the second response candidate data generated by the second response candidate generator means, based on the result of the comparison,
   determining means for determining whether said first score and said second score are above a predetermined threshold value, and recalculating means for recalculating the score or scores determined by the determining step to be above the predetermined threshold value.

9. A voice interactive method of a voice interactive apparatus, comprising:
   a first response candidate generating step of generating first response candidate data responsive to input voice data in accordance with a first rule and of calculating a first score of the generated first response candidate data,
   a second response candidate generating step of generating second response candidate data responsive to the input voice data in accordance with a second rule independent of the first rule, and of calculating a second score of the generated second response candidate data,
   a response selecting step of comparing the first score calculated in the first response candidate generating step with the second score calculated in the second response candidate generating step and of selecting, as response data responsive to the input voice data, one of the first response candidate data generated in the first response candidate generating step and the second response candidate data generated in the second response candidate generating step, based on the result of the comparison,
   a determining step of determining whether said first score and said second score are above a predetermined threshold value, and
   a recalculating step of recalculating the score or scores determined by the determining step to be above the predetermined threshold value.

10. A computer program comprising:
    a first response candidate generating step of generating first response candidate data responsive to input voice data in accordance with a first rule and of calculating a first score of the generated first response candidate data,
    a second response candidate generating step of generating second response candidate data responsive to the input voice data in accordance with a second rule independent of the first rule, and of calculating a second score of the generated second response candidate data,
    a response selecting step of-determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold, and
    a recalculating step of recalculating the score or scores determined by the response selecting step to be above the predetermined threshold value.

11. A storage medium storing a computer readable program, the program comprising:
    a first response candidate generating step of generating first response candidate data responsive to input voice data in accordance with a first rule and of calculating a first score of the generated first response candidate data,
    a second response candidate generating step of generating second response candidate data responsive to the input voice data in accordance with a second rule independent of the first rule, and of calculating a second score of the generated second response candidate data,
    a response selecting step of determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold, and
    a recalculating step of recalculating the score or scores determined by the response selecting step to be above the predetermined threshold value.

12. A voice interactive apparatus comprising:
    first response candidate generator means for generating first response candidate data responsive to input voice data in accordance with a first rule and for calculating a first score of the generated first response candidate data,
    second response candidate generator means for generating second response candidate data responsive to the input voice data in accordance with a second rule independent of the first rule, and for calculating a second score of the generated second response candidate data,
    response selector means for determining whether each of the first score calculated by the first response candidate generator means and the second score calculated by the second response candidate generator means is equal to or larger than a predetermined threshold value, in the order of from the first to second or from the second to first response candidate generator means whichever has priority, and for selecting, as response data responsive to the input voice data, one of the first response candidate data generated by the first response candidate generator means and the second response candidate data generated by the second response candidate generator means whichever has the score that is determined to be equal to or larger than the predetermined threshold, and
    recalculating means for recalculating the score or scores determined by the response selector means to be above the predetermined threshold value.

13. A voice interactive method of a voice interactive apparatus, comprising:
    a first response candidate generating step of generating first response candidate data responsive to input voice data in accordance with a first rule and of calculating a first score of the generated first response candidate data,
    a second response candidate generating step of generating second response candidate data responsive to the input voice data in accordance with a second rule independent of the first rule, and of calculating a second score of the generated second response candidate data,
    a response selecting step of determining whether each of the first score calculated in the first response candidate generating step and the second score calculated in the second response candidate generating step is equal to or larger than a predetermined threshold value, in the order of from the first to second or from the second to first response candidate generating step whichever has priority, and of selecting, as response data responsive to the input voice data, one of the first response candidate data generated in the first response candidate generating step and the second response candidate data generated in the second response candidate generating step whichever has the score that is determined to be equal to or larger than the predetermined threshold, and a recalculating step of recalculating the score or scores determined by the response selecting step to be above the predetermined threshold value.

* * * * *